Figure 1:
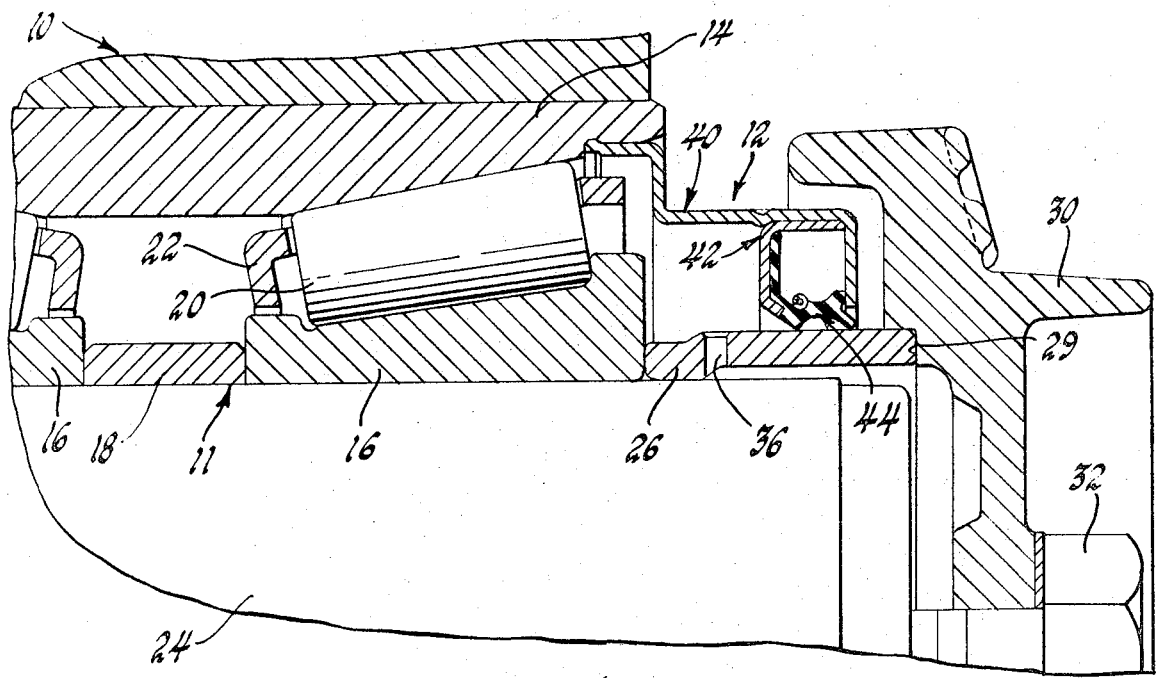

United States Patent [19]
Kelso

[11] 3,841,723
[45] Oct. 15, 1974

[54] RAILWAY BEARING SEAL
[75] Inventor: Albert H. Kelso, Marblehead, Ohio
[73] Assignee: General Motors Corporation, Detroit, Mich.
[22] Filed: May 22, 1973
[21] Appl. No.: 362,932

[52] U.S. Cl. .......................................... 308/187.1
[51] Int. Cl. .......................................... F16c 33/76
[58] Field of Search............... 308/187.1, 187.2, 180

[56] References Cited
UNITED STATES PATENTS
3,472,519  10/1969  Gehret.......................... 308/187.1

Primary Examiner—Charles J. Myhre
Assistant Examiner—Frank Susko
Attorney, Agent, or Firm—Peter D. Sachtjen

[57] ABSTRACT

A seal assembly for a railway journal bearing includes an outer case attached to the bearing outer race and a replaceable inner case carrying an elastomeric sealing element. The sealing element is bonded to an annular rim on the inner case and has a seal lip adjacent the rim engageable with the journalled shaft and a cantilevered flexible section including a dust lip compressively engaging an annular rim on the outer case. A garter spring radially inwardly biases the seal lip against the shaft and the free end of the flexible section against the rim to radially support the dust lip and prevent excessive dust lip pressure.

1 Claim, 2 Drawing Figures

PATENTED OCT 15 1974 3,841,723

RAILWAY BEARING SEAL

The present invention relates to bearing seals and, in particular, a railway bearing seal having a replaceable sealing element.

The bearing seals currently used on railway journal bearings comprise an outer case carried by the outer race of the journal bearing and an inner reinforcing case which is telescopically received within the outer case to provide structural rigidity in assembly. A sealing element is bonded to an outer case and includes a projecting sealing element having a seal lip which engages the journalled shaft for retaining the bearing lubricant. The sealing element also includes a dust lip which lightly engages the shaft to prevent abrasive contaminants from reaching the sealing interface. In this design when the seal lip wears out the entire seal assembly must be replaced.

The present invention provides a bearing seal for railway usage wherein the sealing element is bonded to an annular rim on a replaceable reinforcing case. The seal lip is adjacent the rim and is spring biased into engagement with the shaft. The sealing element includes a projecting flexible section terminating with an inner conical dust lip and an outer annular heel section. The heel section compressively engages a radial rim of the outer case to fixedly radially support the free end of the sealing element. This isolates the dust lip from the radial biasing of the spring to reduce excessive dust lip pressure. When the seal lip wears out, only the reinforcing case need be replaced.

Figure 2:
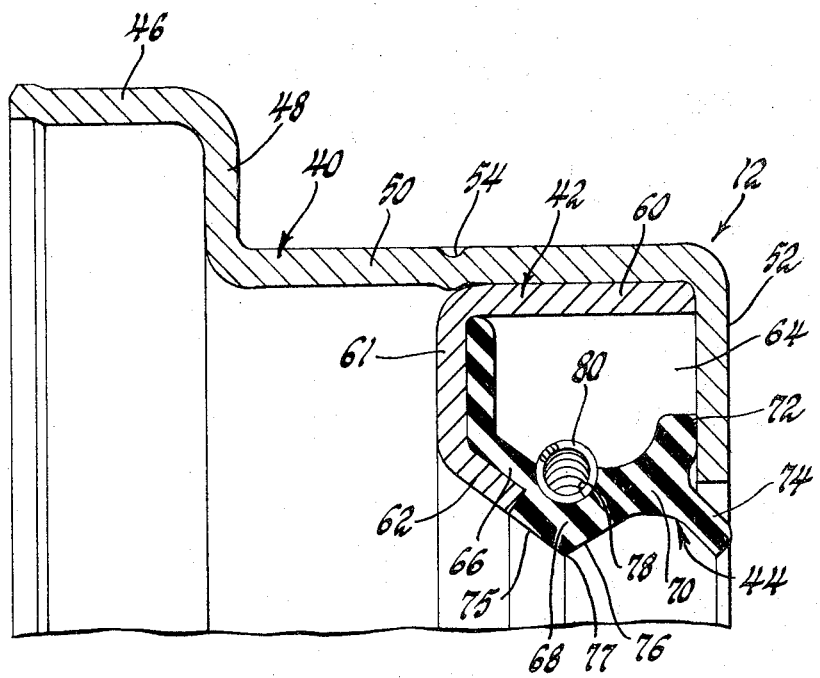

The above and other features of the present invention will be apparent to one skilled in the art upon reading the following detailed description, reference being made to the accompanying drawings illustrating a preferred embodiment of the present invention in which:

FIG. 1 is a fragmentary side cross sectional view of a railway journal bearing incorporating a seal assembly made in accordance with the present invention; and FIG. 2 is an enlarged fragmentary cross sectional view of the seal assembly.

Referring to the drawings there is shown a railway freight car bearing adapter 10 including a journal bearing 11 provided with a seal assembly 12. The journal bearing 11 is of a conventional construction comprising a one piece outer race 14 and a pair of inner races 16 mutually spaced by a spacer 18. The races 14 and 16 are separated by tapered roller bearing elements 20 which are circumferentially spaced by a bearing cage 22. The inner races 16 and the spacer 18 are received over a shaft 24. A wheel (not shown) is carried on the inboard end of the shaft 24. A sealing ring 26 is pressed over the shaft 24 and has an inner end which engages the race 16 and an outer end which engages a recessed shoulder 29 of an end cap 30. The end cap 30 is mounted on the outboard end of the shaft 24 by bolts 32 to axially clamp the bearing elements. The adapter and bearing assembly as above described are conventional in construction and form no part of the present invention.

The space between the sealing ring 26, the end of the shaft 24 and the end cap 30 is supplied with a lubricant through a grease fitting (not shown) in the end cap 30. The lubricant flows outwardly through a vent 36 in the sealing ring 26 to supply lubricant to the bearing assembly. The seal assembly 12 serves to retain the lubricant at the bearing and prevent the ingress of abrasive contaminants to the bearing elements. The seal assembly 12 comprises an outer mounting case 40 and an inner reinforcing case 42 carrying a sealing element 44.

Referring to FIG. 2, the outer case 40 includes a cylindrical end section 46 retained within a complementary groove in the outer race 14, an intermediate radial section 48, and a cylindrical sleeve section 50 terminating at the outboard end with a radially inwardly extending annular rim 52. A plurality of inwardly spaced detents 54 on the sleeve section 50 define projections for releasably securing the reinforcing case 42 in assembly.

The reinforcing case 42 comprises an outer cylindrical sleeve section 60 which is telescopically received within the sleeve section 50 of the outer case 40. The sleeve section 60 is axially positioned between the rim 52 and the detents 54. The inboard end of the sleeve section 60 terminates with a radially inwardly extending annular rim 61 including a radially inwardly converging conical wall 62. The mutually facing inner surfaces of the rims 52, 61 and the sleeve section 60 define a radially inwardly opening annular channel 64.

The sealing element 44 includes a head section 66 directly bonded to the wall 62 of rim 61 and a cantilevered projecting flexible section including a seal lip body 68 and a cylindrical annulus 70 having a free end including an outer heel 72 and an inner conical dust lip 74.

The seal lip body 68 includes a pair of converging frustoconical surfaces 75, 76 defining at their apex an annular seal lip 77. The seal lip 77 is adapted to compressively engage the outer surface of the sealing ring 26 to define a sealing interface which prevents the outward migration of the bearing lubricant. A circumferential groove 78 is formed in the outer surface of the seal lip body 68 in substantially the same axial plane as the seal lip 77. A helically coiled garter spring 80 is retained in the groove 78. The spring 80 radially inwardly biases the seal lip 77 against the sealing ring 26. The dust lip 74 extends radially inwardly from the heel 72 and has an inner diameter slightly smaller than the outer diameter of the sealing ring 26. This establishes a light compressive contact with the outer surface sufficient to prevent the inward migration of dirt and contaminants. To minimize the wear of the dust lip it is desirable to rely solely upon the resilience of the dust lip section. It is undesirable to have any active spring biasing on the dust lip inasmuch as this can produce premature wear of the dust lip. In the present invention, the dust lip 74 is isolated from spring biasing by the heel 72. The heel 72 engages the inwardly facing surface of the rim 52 to radially support the free end and isolate the dust lip from the resultant force developed by the spring 80.

When the seal lip 77 wears out, the inner casing 42 may be axially withdrawn past the detents 54 from the outer casing 40 and replaced by a new reinforcing case and sealing element thereby salvaging the use of the outer case 40.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. In a railway journal box bearing assembly having an outer race mounted on said journal box, an inner race mounted on a rotatable shaft, antifriction elements between said races, and a sealing ring having an opening for conveying lubricant toward said elements mounted on the shaft, a seal comprising: an outer case having an axially extending cylindrical sleeve section connected at one end to the outer race and terminating at the other end with a radially inwardly extending annular rim; a replaceable inner case having an elastomeric sealing element, said inner case having an axially extending sleeve section releasably engaging the inner surface of said sleeve section of said outer case and engaging said rim of said outer case; a radially inwardly extending annular rim on said inner case axially spaced in assembly from said annular rim of said outer case to define an inwardly opening annular channel, a pair of converging frustoconical walls formed on the inner surface of said sealing element adjacent said rim, said surfaces defining a seal lip engageable with said sealing ring outboard of said opening therein, a projecting cantilevered flexible section extending from said seal lip terminating at the other end with an annular heel compressively engaging said rim of said outer case to fixedly position the other end of said sealing element, an annular spring retaining groove in the outer surface of said sealing element substantially axially aligned with said seal lip, a helically coiled spring retained in said retaining groove for radially inwardly biasing the seal lip against said sealing ring to establish a sealing interface for retaining lubricant at the biasing elements, said spring axially biasing said heel against said rim of said outer case, an annular dust lip formed on the inner surface of the element adjacent said other end, said dust lip having an interference fit with said other member, the engagement of said heel and said rim radially supporting said other end of said sealing element to isolate the dust lip from the resultant force of the spring.

* * * * *

UNITED STATES PATENT OFFICE
CERTIFICATE OF CORRECTION

PATENT NO. : 3,841,723
DATED : October 15, 1974
INVENTOR(S) : Albert H. Kelso

It is certified that error appears in the above-identified patent and that said Letters Patent are hereby corrected as shown below:

Column 4, line 15, "other member" should read -- sealing ring --.

Signed and sealed this 17th day of June 1975.

(SEAL)
Attest:

RUTH C. MASON
Attesting Officer

C. MARSHALL DANN
Commissioner of Patents
and Trademarks